No. 885,342. PATENTED APR. 21, 1908.
H. E. HEATON.
SPRING WHEEL.
APPLICATION FILED APR. 9, 1907.

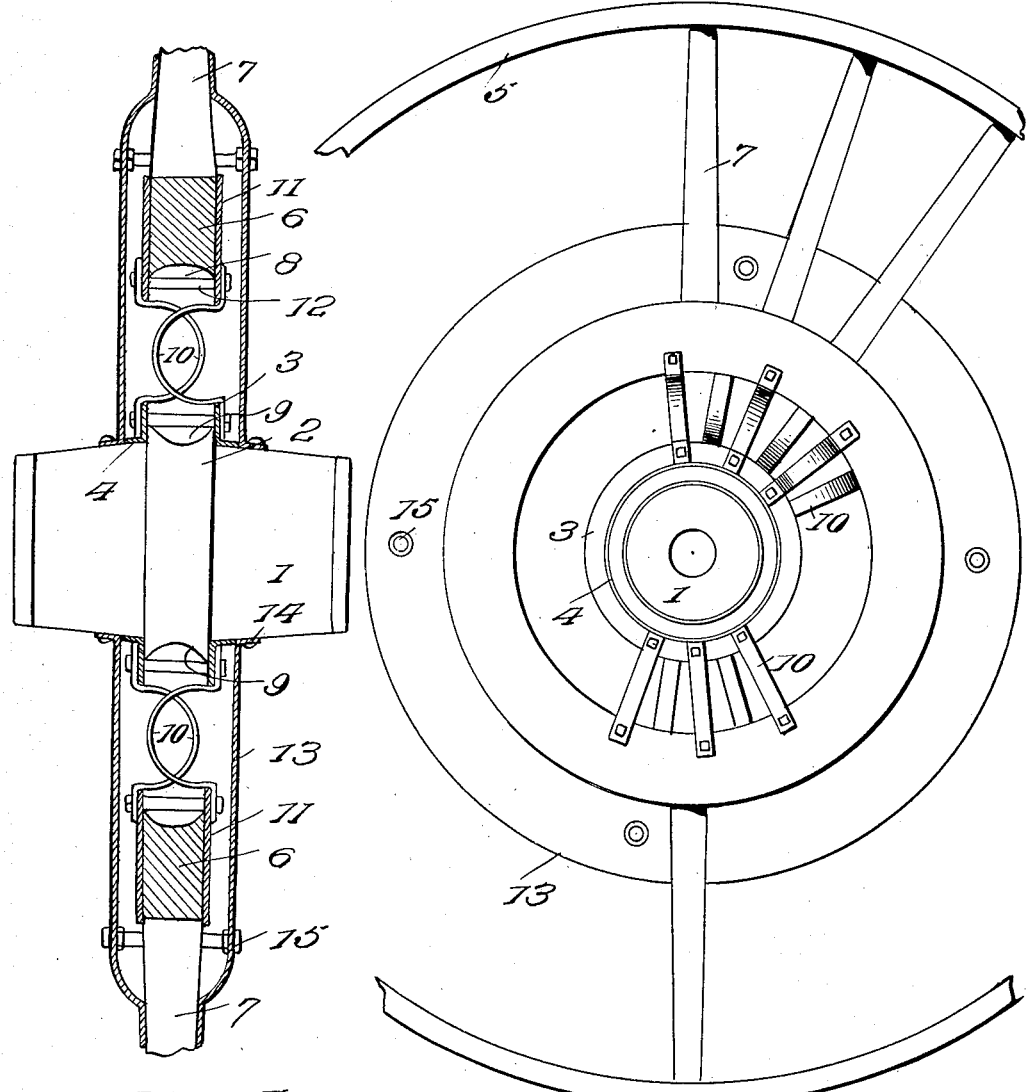

2 SHEETS—SHEET 2.

Witnesses

Inventor
H. E. Heaton
By
Attorneys

UNITED STATES PATENT OFFICE.

HENRY E. HEATON, OF OROVILLE, CALIFORNIA.

SPRING-WHEEL.

No. 885,342.      Specification of Letters Patent.      Patented April 21, 1908.

Application filed April 9, 1907. Serial No. 367,137.

*To all whom it may concern:*

Be it known that I, HENRY E. HEATON, citizen of the United States, residing at Oroville, in the county of Butte and State of California, have invented certain new and useful Improvements in Spring - Wheels, of which the following is a specification.

The present invention relates to certain new and useful improvements in the construction of vehicle wheels and aims to provide a novel means whereby all shocks and jars are absorbed through the medium of metallic springs and thereby prevented from being transmitted to the body of the vehicle.

A further object of the invention is to design a simple and efficient wheel of this character which will be very durable in use and which can be easily and quickly repaired when necessary.

Figure 3:
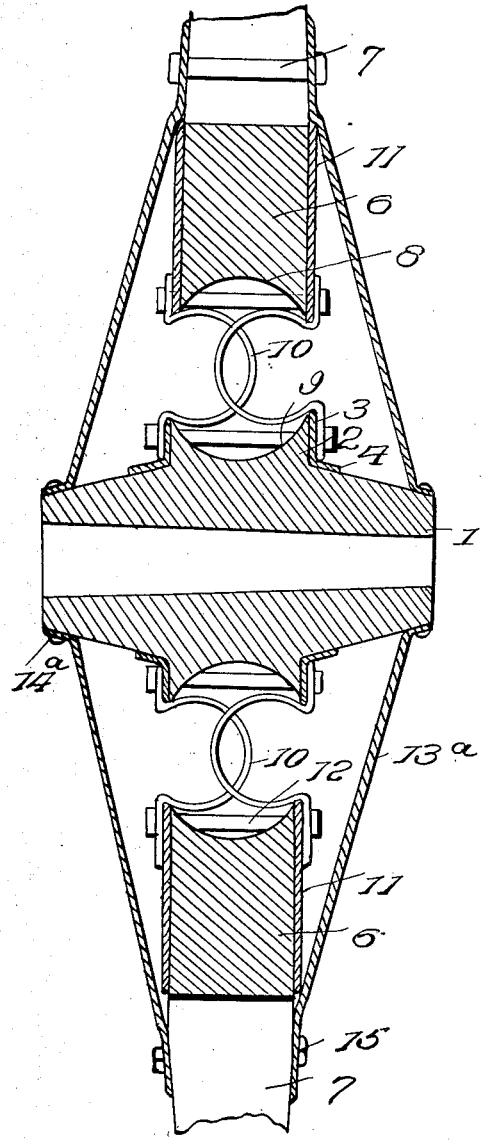
Figure 4:
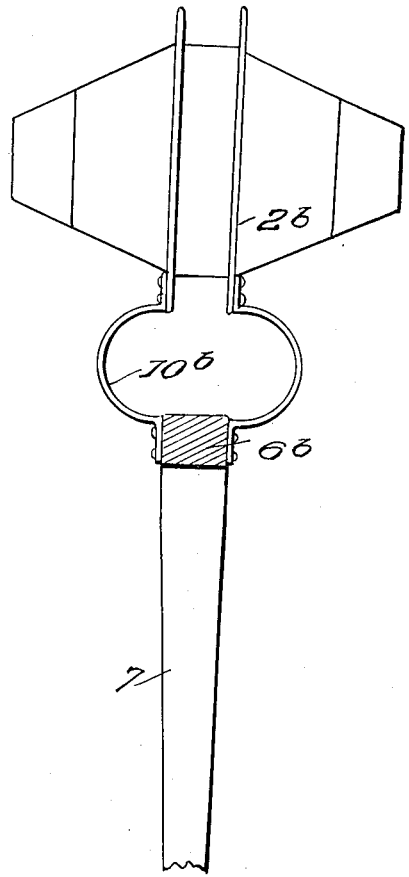

For a full description of the invention and the merits thereof and also to acquire a knowledge of the details of construction and the means for effecting the result, reference is to be had to the following description and accompanying drawings, in which:

Figure 1 is a vertical sectional view through a wheel constructed in accordance with the present invention. Fig. 2 is a side elevation of the same, parts being broken away. Fig. 3 is a vertical sectional view showing a modified form of protective casing for the spring members. Fig. 4 is a similar view showing a second modification.

Corresponding and like parts are referred to in the following description and indicated in all the views of the drawings by the same reference characters.

The numeral 1 designates the hub of the wheel which is formed with the usual axle receiving opening and which is provided upon its exterior with the annular rim or enlargement 2, the outer portion of the rim having the annular depression 9 in the periphery thereof. Slipping over opposite ends of the hub 1 and fitting against the two sides of the annular rim 2 are the metallic rings 3 the outer edges of which project beyond the said rim 2, while the inner edges are formed with the flanges 4 which may be secured to the hub of the wheel in any suitable manner. The body portion of the wheel comprises the outer rim 5 to which any conventional form of tire may be applied, and the inner concentric rim 6 which is connected to the outer rim by means of the spokes 7. This inner rim 6 is formed upon its inner face with the annular depression 8 which faces the depression 9 in the annular rim 2 and coöperates therewith to form ample clearance space for the spring members 10 connecting the hub and body portion of the wheel. Fitting against the opposite sides of the inner rim 6 are the reinforcing plates 11, the inner edges of which project somewhat beyond the rim.

In the specific construction of the spring members 10 it will be observed that the same comprise metallic strips having their end portions overlapping and secured to the inner rim 6 and annular rim 2 respectively, while their intermediate portions are bowed inwardly and extend between the said inner rim 6 and annular rim 2. These springs 10 are located alternately upon opposite sides of the wheel and are designed to absorb all shocks and jars brought to bear upon the body portion of the wheel and prevent the same from being transmitted to the hub. In the present instance the bolts 12 employed for securing the spring members 10 in position are passed through the projecting portions of the reinforcing plates 11 and the rings 3 respectively.

In order to protect the springs 10 from rain and dust and also for the purpose of reinforcing the wheel it may be found desirable to employ guard members such as the circular plates 13 applied to opposite sides of the wheel. The central portion of each of these plates is pressed outwardly to form the flange 14 which fits over the hub and is rigidly connected thereto, while the outer portion of each of the plates extends inwardly toward the spokes. It will also be observed that the peripheral portions of the two plates 13 are connected by fastening members such as bolts 15 which pass between the spokes 7 and have no direct connection with the body of the wheel, A slightly modified form of guard plate is shown at 13$^a$ in which the outwardly pressed central flange 14$^a$ is secured to the extremity of the hub and the body portion of the guard plate is gradually inclined inwardly toward the spokes.

A modification is shown in Fig. 4 in which the spring members 10$^b$ are in the nature of metallic strips having their end portions rigidly connected to the annular rim 2$^b$ upon the hub and the inner rim 6$^b$ of the body portion of the wheel respectively. In this form of the invention however the middle portion of the metallic strips is bowed outwardly and the corresponding spring members are arranged in oppositely disposed pairs instead of alternately as in the previous instance. In both forms of the invention however it will be observed that the spring members are in the nature of strips having their intermediate portions bowed and given an approximately U formation, the extremities of the strips being extended at an angle to the arms of the said U-shape portion.

Having thus described the invention, what is claimed as new is:

1. In a wheel, the combination of a hub formed with an annular rim having the periphery thereof depressed, a body portion comprising a rim spaced from the said annular rim of the hub and having the inner face thereof depressed, and spring members connecting the rim of the hub and the rim of the body portion of the wheel and designed to be received within the clearance space formed by the before mentioned depressions.

2. In a wheel, the combination of a hub formed with an annular rim having the periphery thereof depressed, a body portion comprising an inner rim having the inner face thereof depressed, and spring strips arranged alternately upon opposite sides of the wheel and having their respective ends connected to the annular rim of the hub and the inner rim of the body of the wheel, the middle portions of the springs being bowed inwardly and operating within the clearance space formed by the before mentioned depressions in the rims.

3. In a wheel, the combination of a hub formed with the annular rim, rings fitting against the opposite sides of the annular rim, a body portion comprising a rim receiving the annular rim of the hub and spaced therefrom, reinforcing plates secured to opposite sides of the said rim of the body portion, and spring strips having their ends attached respectively to the said reinforcing plates and rings, intermediate portions of the spring strips being bowed outwardly and given an approximately U shaped formation.

4. In a wheel, the combination of a hub formed with an annular rim, rings fitting against the opposite sides of the annular rim and projecting outwardly beyond the same, a body portion comprising an inner rim spaced from the annular rim of the hub, reinforcing plates secured to opposite sides of the inner rim and extending inwardly beyond the same, and spring strips having their respective ends secured to the inwardly projecting portions of the reinforcing plates and the outwardly projecting edges of the rings, the said spring strips having the intermediate portions thereof bowed inwardly and extending between the before mentioned rims.

In testimony whereof I affix my signature in presence of two witnesses.

HENRY E. HEATON.

Witnesses:
WILLIAM W. WILL,
WALLACE R. TURNER.